March 7, 1961 L. PRICE 2,973,582
GAGES FOR CONTOUR AND ALIGNMENT CONTROL
Filed July 10, 1958 8 Sheets-Sheet 5

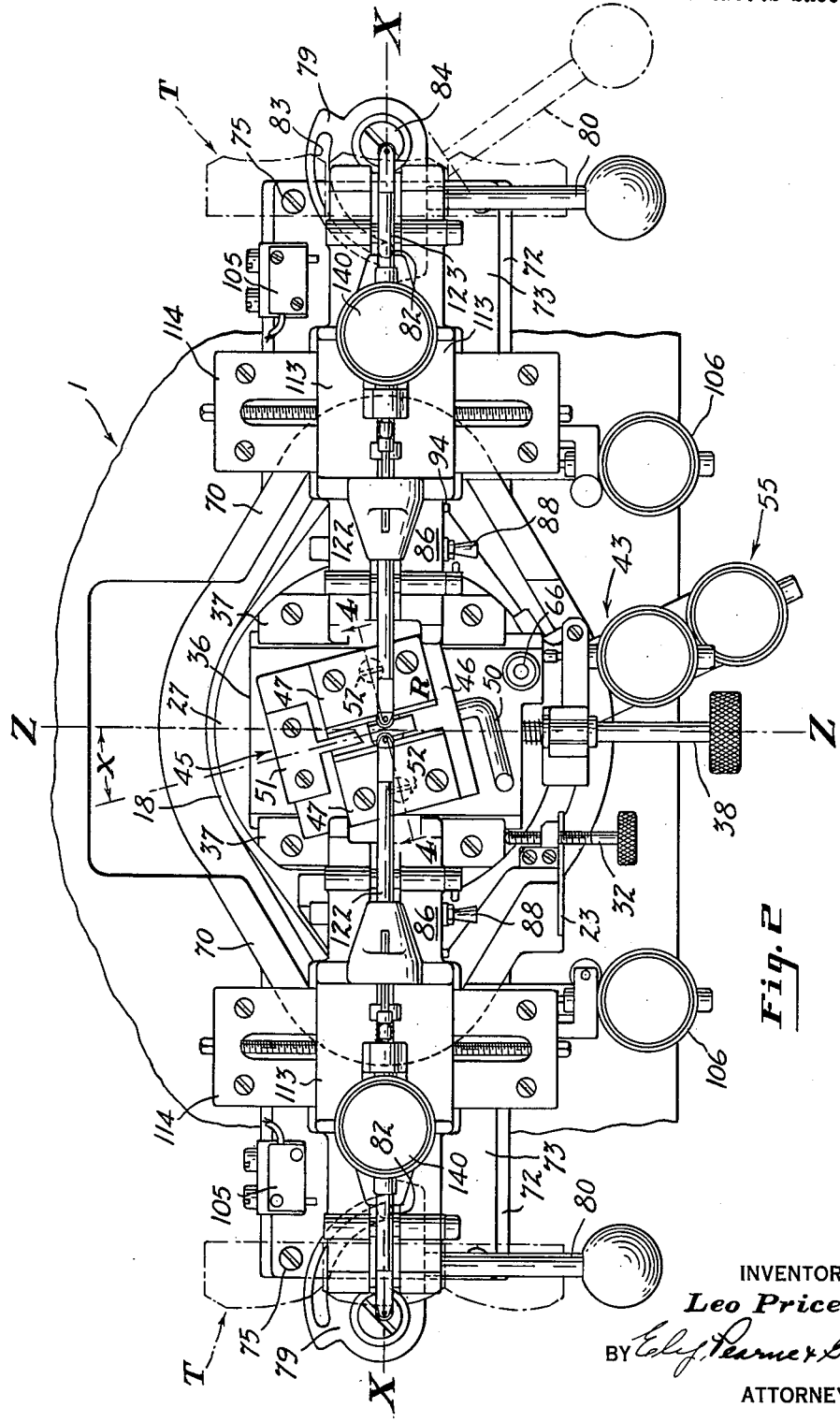

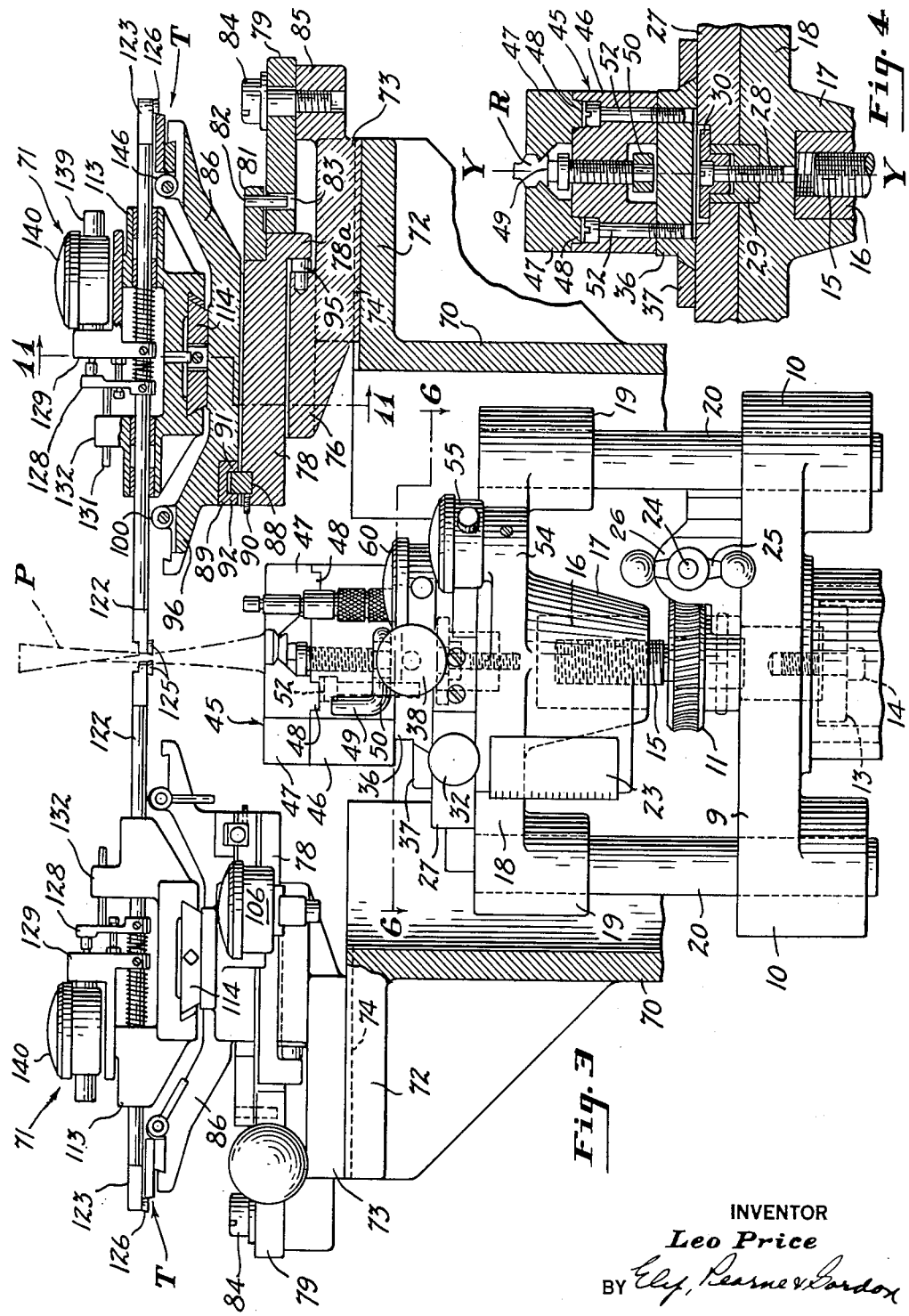

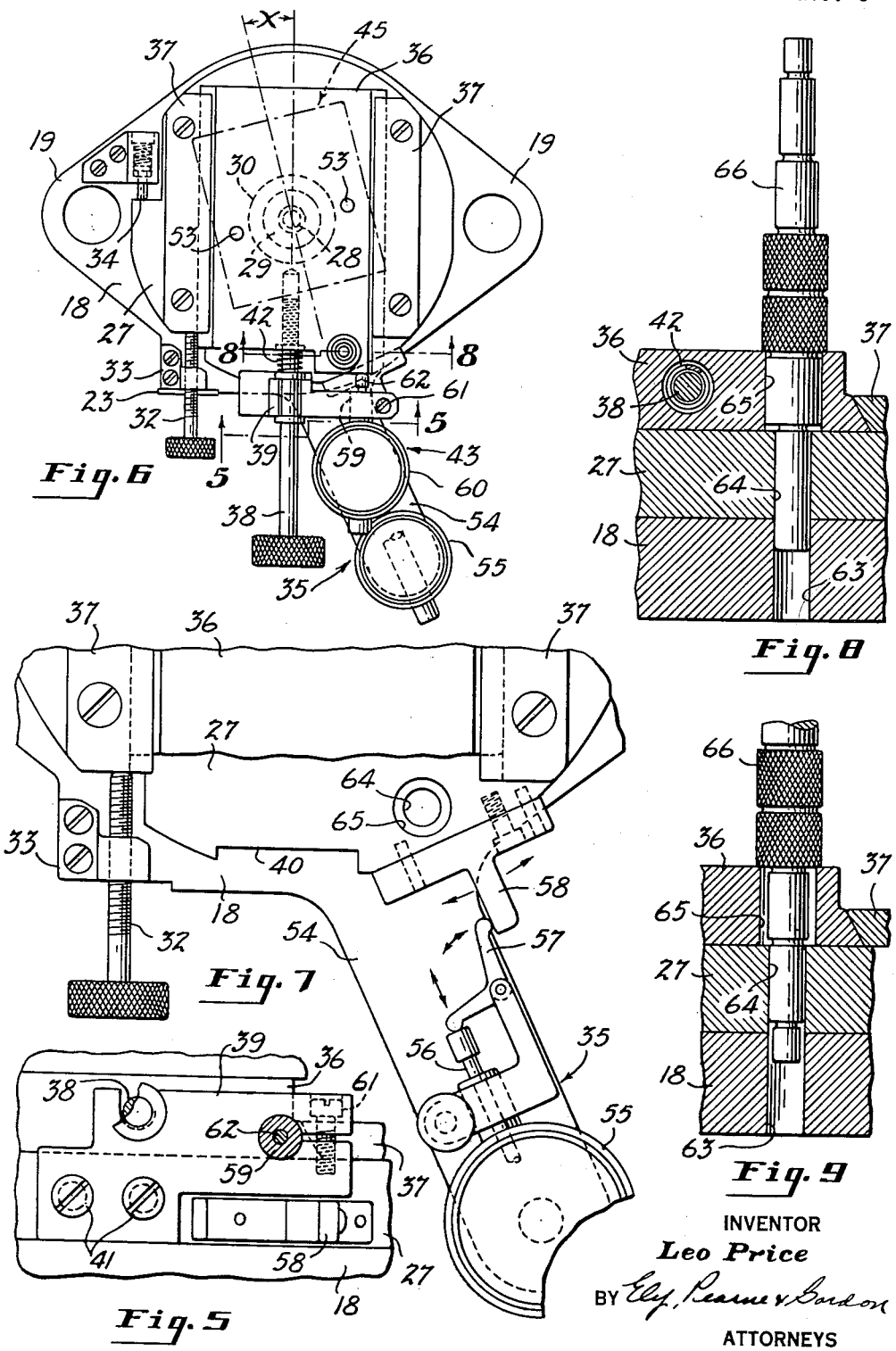

INVENTOR
Leo Price
BY Ely, Pearne & Gordon
ATTORNEYS

March 7, 1961　　　　L. PRICE　　　　2,973,582
GAGES FOR CONTOUR AND ALIGNMENT CONTROL
Filed July 10, 1958　　　　　　　　　　　　8 Sheets-Sheet 6

INVENTOR
*Leo Price*
BY Ely, Pearne & Gordon
ATTORNEYS

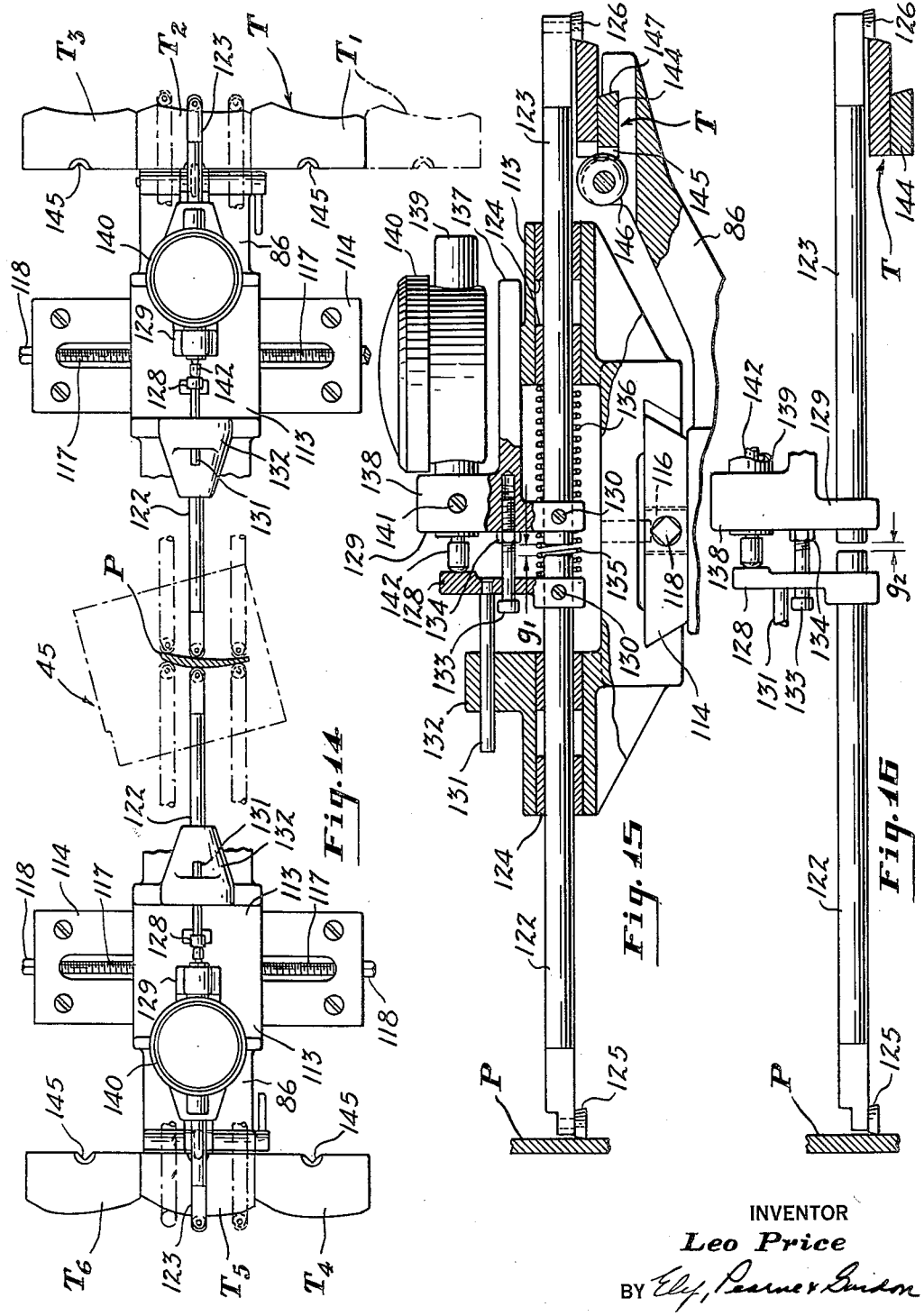

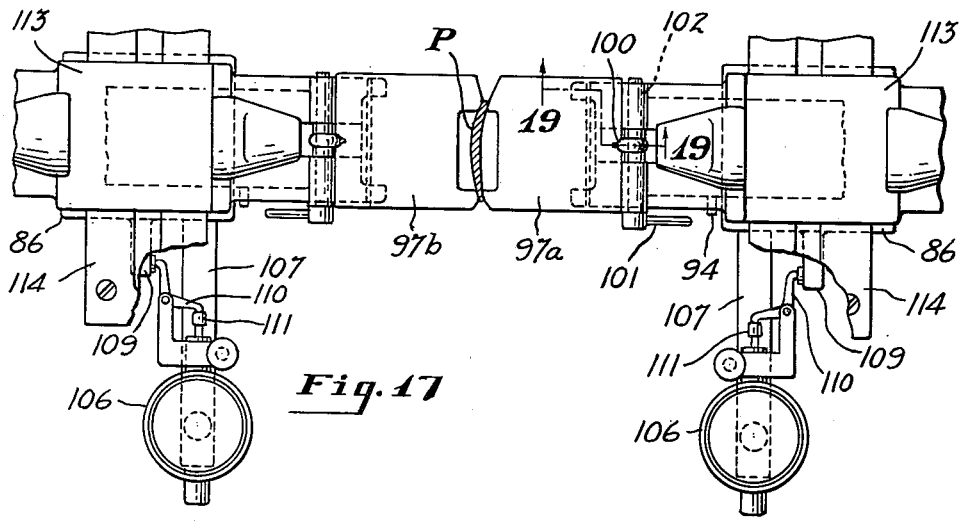
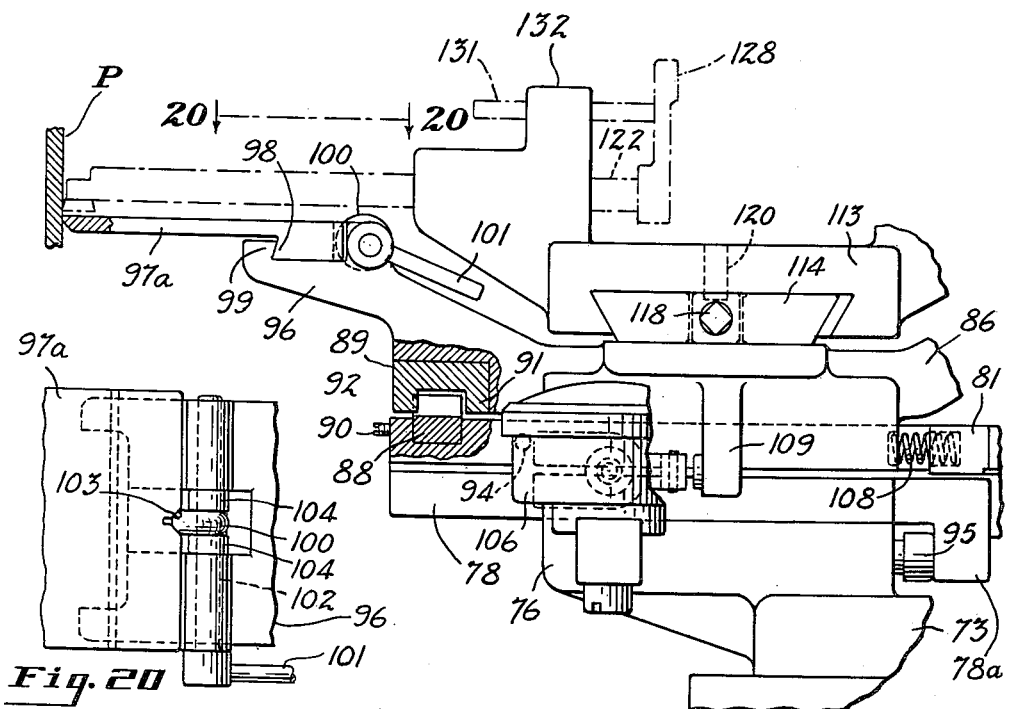
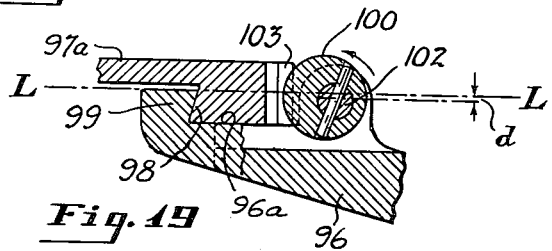

United States Patent Office 2,973,582
Patented Mar. 7, 1961

2,973,582
GAGES FOR CONTOUR AND ALIGNMENT CONTROL

Leo Price, Cleveland, Ohio, assignor to Winslow Manufacturing Company, Cleveland, Ohio, a corporation of Ohio Filed July 10, 1958, Ser. No. 747,666
14 Claims. (Cl. 33—174)

This invention relates to gages used for contour and alignment control in the manufacture of precision-built components of machinery of all kinds. More particularly, the invention relates to gages similar in many respects to the so-called "guillotine gages" of the prior art but having novel and improved means for detecting measuring, and analyzing deviations of the contour and alignment of a machine part relative to a master template or the like.

Although the invention has been developed primarily for inspection of jet engine turbine blades, with which its use is illustrated herein, the utility of the invention is in no sense limited to such use. With reference to its use for inspection of the complex shapes of jet engine turbine blades, most of the principal features and advantages of the invention may be illustrated at one time. Thus, when used for this purpose, the gages of the present invention may be manipulated to check all of the following vital features in which turbine blades may be defective to varying degrees:

(1) Contour.
(2) Thickness.
(3) Bow.
(4) Twist (airfoil section in relation to root or in relation to another airfoil section of the blade).
(5) Axial displacement (airfoil section in relation to root).
(6) Tangential displacement (airfoil section in relation to root).
(7) Lean.

In each instance, the invention enables all of the above features to be checked in such a manner that deviations from a prototype may be directly read or quickly calculated quantitatively and with a high degree of accuracy. Ordinary guillotine gages merely disclose deviations in one or more of the above respects and whether the deviations are large or small, but do not disclose, in many cases, which one or ones of the above causes are responsible for the deviations and to what relative degrees. Thus, ordinary guillotine gages are largely limited in their practical use to the detection of defective parts.

By enabling each of the above listed causes of deviations to be individually measured quantitatively, the present invention provides a means for also identifying the causes of measured deviations in a defective part from a prototype and for determining the precise correction required to eliminate the defects. Thus, the present invention provides a gage that is useful both for detecting defective parts and for analyzing the defects to determine what corrective measures are required.

The objects of the invention are to provide gages which have substantially the accuracy of earlier guillotine gages in detecting the presence of defects and also have the additional attributes mentioned above which greatly extend their utility as described. Various more specific objects of the invention will become apparent from the detailed description of the invention that follows herein.

A particularly significant feature of the invention is a novel mechanism referred to herein as a contour analyzer enabling the contour of one or both sides of a test part to be checked progressively over the width of a section of the part and such checks to be repeated at successive sections along the length of a part to provide data for detecting and measuring various types of errors in addition to errors in contour. Still another significant feature of the invention is the novel cooperative relationship between the contour analyzer and means for adjusting the position of a test part for checking with the contour analyzer.

Another significant feature of the invention is the combination of the contour analyzer with a modified type of guillotine gage whereby the position of a test part on the machine can be quickly adjusted to preliminarily orient the surface or airfoil of the part relative to a fixed template, thus speeding up the orientation of the surface of the part relative to the corresponding surface of the template. The modified type of guillotine gage associated with the contour analyzer may also be used alone to quickly make quantitative measurements of thickness and tangential tilt, for example.

Another important feature of the invention is an improved lock for locking templates and guillotine gage blades in place on the machine.

Still other features of the invention will also become apparent from the detailed description of the invention that follows herein.

The foregoing and other objects, advantages, and features of the invention will be further described and illustrated with reference to a presently preferred illustrative embodiment of the machine shown in the accompanying drawings. It is to be understood, however, that the invention is not limited to the particular embodiment selected for illustrative purposes. Referring to the drawings—

Fig. 2 is a plan view of the machine on a somewhat larger scale, portions of the base of the machine being broken away for simplicity;

Fig. 3 is a similarly enlarged elevational view of the upper part of the machine with the typical turbine blade mounted thereon for testing, portions of the machine being shown in vertical section;

Fig. 4 is a similarly enlarged fragmentary vertical sectional view of the machine taken through the main vertical axis thereof as indicated by the line 4—4 in Fig. 2.

Fig. 5 is a fragmentary vertical sectional view, on a further enlarged scale, of a bracket for mounting one of the indicating gages and for also mounting an adjusting screw constituting part of the movable and adjustable head on which the holder for parts to be tested is mounted, the section being taken as indicated by the line 5—5 in Fig. 6;

Fig. 6 is a plan view of the movable and adjustable head on which the holder for parts to be tested is mounted, shown on the same scale as Fig. 3 and taken as indicated by the line 6—6 of Fig. 3;

Fig. 7 is a further enlarged fragmentary plan view of the movable and adjustable head of Fig. 6, but with certain upper parts thereof removed or broken away to show underlying details;

Fig. 8 is a fragmentary vertical sectional view of a centering arrangement and locking pin constituting part of the structure shown in Figs. 6 and 7, the view being taken as indicated by the line 8—8 of Fig. 6 but made to the scale of Fig.7;

Fig. 9 is a fragmentary vertical sectional view similar to Fig. 8, but with the locking pin reversed to permit limited movement of parts of the head relative to one another;

Figure 10:
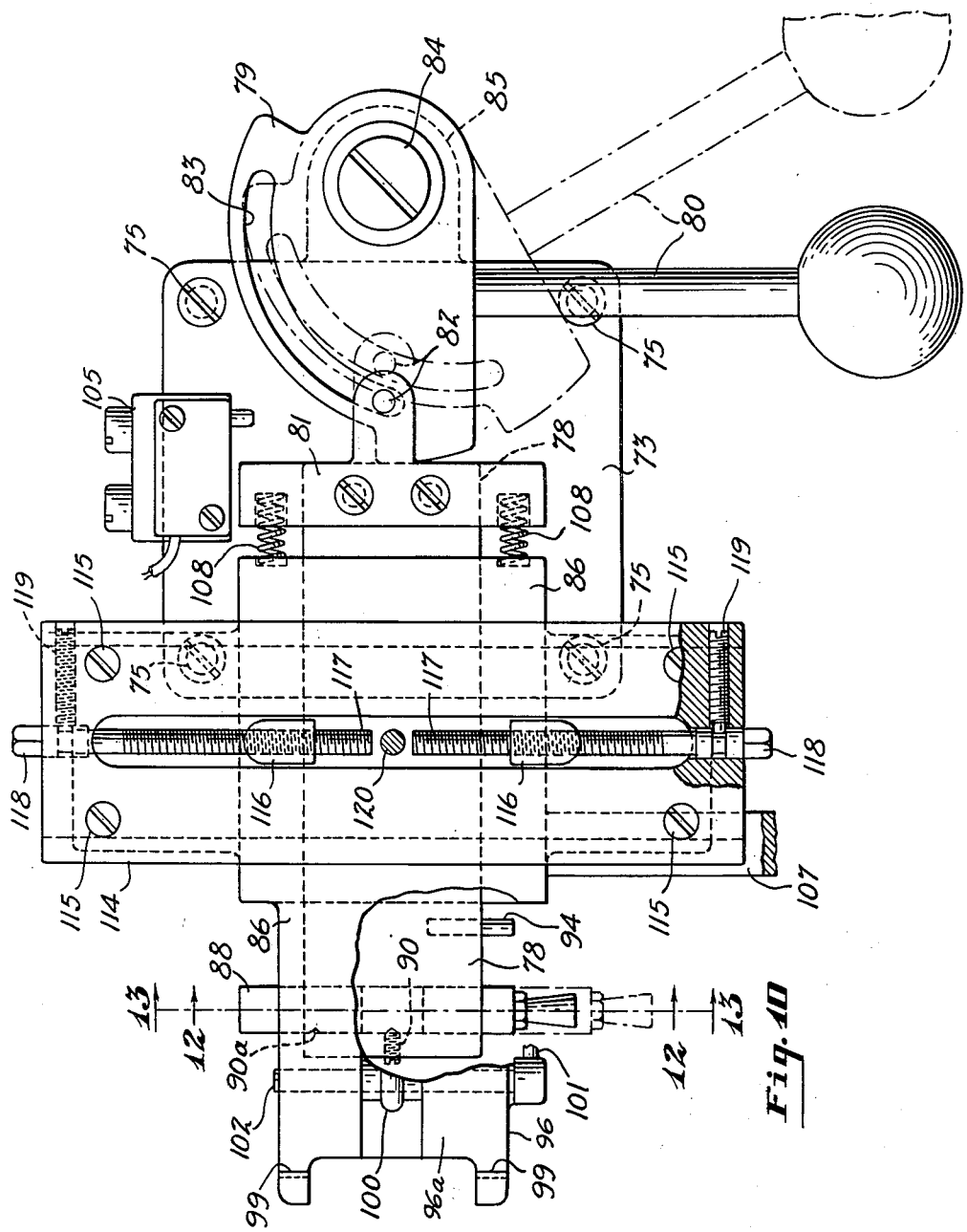
Fig. 10 is a plan view on an enlarged scale of the movable base for mounting the contour analyzer and a guillotine gage template on one side of the machine, the view being similar to the right-hand side of Fig. 2, but drawn to the scale of Figs. 7-9, with the contour analyzer itself removed and other parts broken away to show underlying details.
Figures 12, 13:
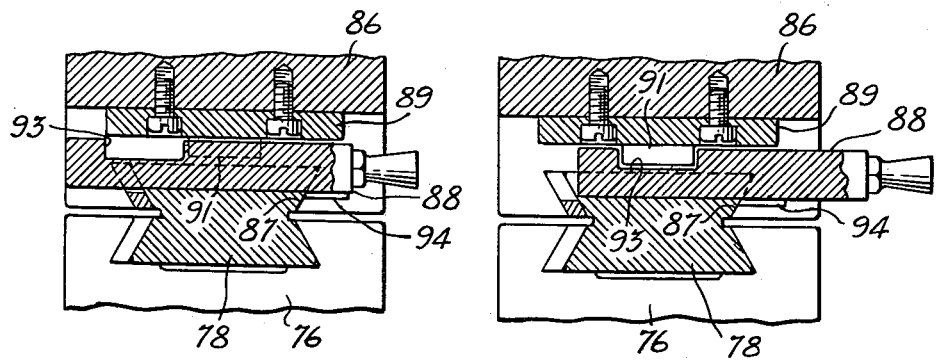

Figs. 12 and 13 are similar fragmentary vertical sections of a releasable carriage-locking mechanism forming a part of the structure of Fig. 10, Fig. 12 being taken on the line 12—12 of Fig. 10 (showing the carriage locked) and Fig. 13 being taken in the same plane as Fig. 12, as indicated by the line 13—13 in Fig. 10, but showing the carriage unlocked to permit travel thereof;

Fig. 14 is a plan view of the two units of the contour analyzer forming a part of the machine as shown in Fig. 2, drawn to the same scale as Fig. 2, but showing a test part and a pair of master template cartridges mounted in place in cooperative relationship with the contour analyzer;

Fig. 15 is a fragmentary vertical elevational view of one of the two contour analyzer units of the machine and the associated test part and master template cartridge as shown in Fig. 14, but on a further enlarged scale and with various parts broken away or shown in vertical section;

Fig. 16 is a similar view of only the essential moving parts of the contour analyzer unit of Fig. 15 after these parts have been moved horizontally some distance along the test part and a master template, Figs. 15 and 16 together showing how departures of the contour of the test part from the corresponding contour of the master template are measured quantitatively;

Fig. 17 is a fragmentary plan view of the machine, on the same scale as Fig. 2, showing a pair of special guillotine gage templates mounted on the machine and moved inwardly into engagement with a part P positioned on the machine for testing, the part P being shown in horizontal section and the contour analyzer mechanism being removed and various parts being broken away to better show the guillotine gage template and how it is mounted;

Fig. 18 is a fragmentary elevational view showing one side of the structure shown in Fig. 17 on an enlarged scale, certain parts of the machine being broken away for clarity of illustration and the test part P being shown in vertical section;

Fig. 19 is a still further enlarged, fragmentary, vertical sectional view of the structure of Fig. 18 showing details of the mounting of the special guillotine gage template on the machine, the section being taken as indicated by the line 19—19 in Fig. 17; and Fig. 20 is a plan view on a reduced scale of the guillotine gage blade mounting structure of Fig. 19, as indicated by the line 20—20 in Fig. 18.

Figure 1:
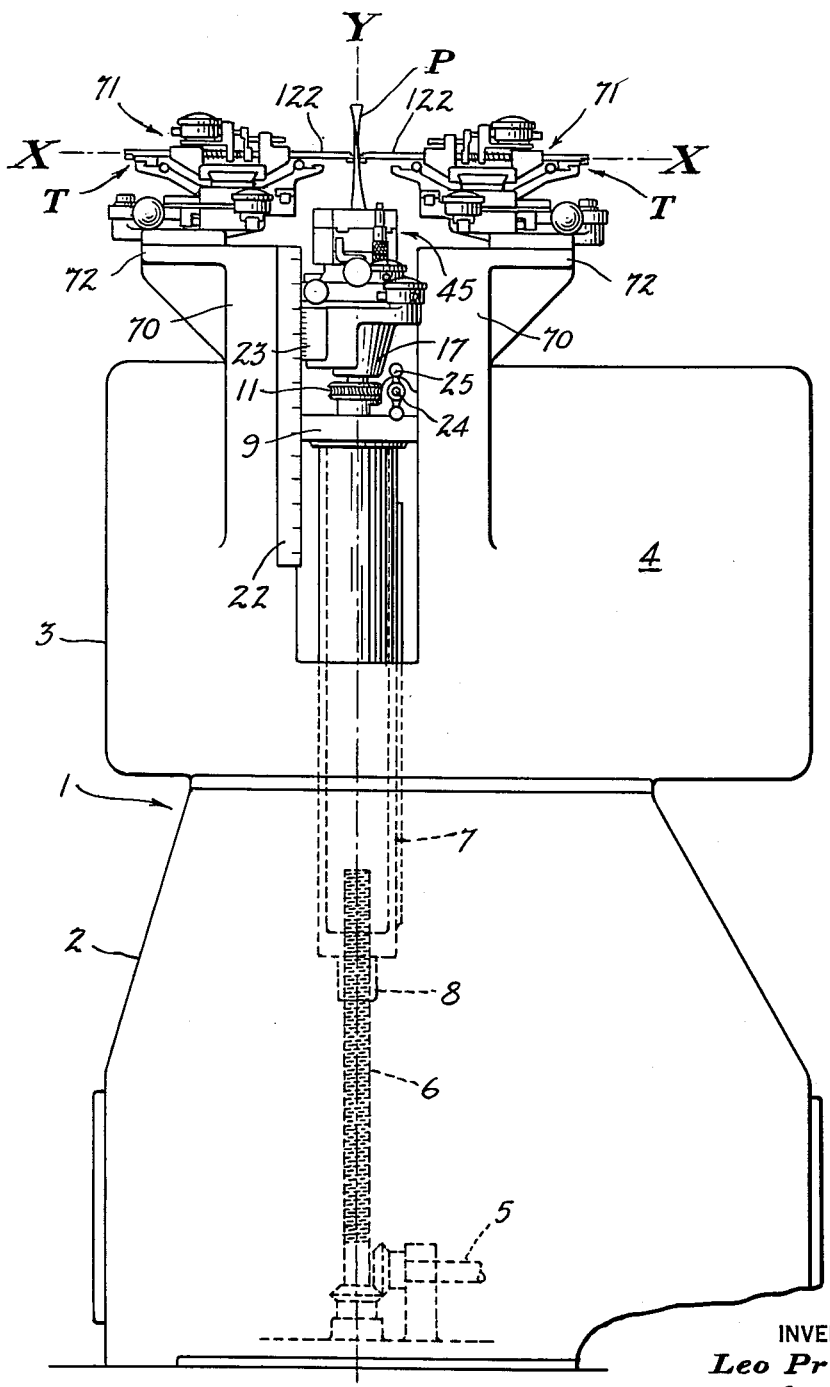
Figure 1 is an elevational view on a greatly reduced scale of a machine embodying the invention, a typical jet engine turbine blade being shown mounted thereon for testing.

Referring first to Fig. 1 of the drawings, the machine may be constructed on any suitably rigid frame, such as the cast iron frame 1 that is adapted to rest on a floor and support the manipulated parts of the machine at a convenient height for a machine operator, preferably about chest high. As shown, the frame may include a lower hollow support portion 2 housing a powered drive mechanism for raising and lowering a test part on the machine, and an upper hollow portion 3 providing a surface of suitable shape for mounting any desired drive mechanism control panel at a location 4, as well as a rigid base for mounting the gage mechanism itself which embodies the significant features of the invention.

The drive mechanism for raising and lowering a test part on the machine may comprise an input shaft 5 journaled in a suitable frame bracket and adapted to be driven in any desired manner, such as a reversible motor (not shown) which may be located in the lower portion 2 of the frame, or elsewhere as desired. The input shaft 5 may be connected by suitable beveled gears, as shown, to a screw shaft 6 for rotating the same, the screw shaft being journaled at its lower end in a thrust bearing carried by the frame for axially supporting the screw shaft 6. An elongated yoke 7 may be provided with an internally threaded boss 8 at its lower end surrounding the screw shaft 6 in driven engagement therewith for raising and lowering the yoke. The upper end of the yoke 7 may be rigidly secured to or formed integrally with a rigid yoke plate 9 having apertured bosses 10 at opposite ends thereof (Fig. 1).

The yoke plate 9 has a worm wheel 11 resting thereon for rotation about the same vertical axis as the screw shaft 6. As shown in Fig. 3, the worm wheel 11 is secured in driving relation on a short fine adjustment shaft 15 having its upper end threaded into a sleeve 16 that is secured in a central boss 17 of a rigid table plate 18 for raising and lowering the same relative to the yoke plate 9. The adjustment shaft 15 is pinned to and supported by the worm wheel and has an enlarged lower end that extends downwardly through the worm wheel and the yoke plate 9. The adjustment shaft is held down by a retainer plate 13 and a bolt 14 that is threaded into the lower end of the adjustment shaft to hold the retainer plate in slidable engagement with the bottom of the yoke plate 9.

The table plate 18 has apertured bosses 19 at opposite ends thereof in which vertical guide posts 20 are rigidly mounted. The guide posts 20 extend downwardly through the apertured bosses 10 of the yoke plate 9 with a sliding fit for guiding vertical travel of the table plate 18 relative to the yoke plate 9. An elongated linear scale 22 may be mounted on the upper portion 3 of the frame 1 for cooperation with a vernier scale 23 carried by the table plate 18 to indicate the height of the table plate and of a test part mounted thereon.

Major adjustments of the height of the table plate 18 may be made by rotating the input shaft in either direction as required. This raises or lowers the yoke 7, yoke plate 9, worm wheel 11, vernier shaft 15, and table plate 18, all as a unit. Minor adjustments of the height of the table plate 18 may be made by rotating the worm gear 11 to drive the vernier shaft 15 in either direction as required. This raises or lowers the table plate 18 relative to the yoke plate 9 and, therefore, relative to the frame 1. For this purpose, a worm shaft 24, rotated by a hand crank 25 (Figs. 1 and 3) and journaled for rotation in a bearing bracket 26 on the yoke plate 9, extends rearwardly in driving engagement with the worm wheel 11.

A test part holding mechanism is mounted on the table plate 18 for translational adjustment of the position of a test part in a fixed horizontal direction and for rotational adjustment thereof about a vertical axis which is the axis of the screw shaft 6 and may be considered as the main vertical axis Y—Y of the machine. The test part holding mechanism comprises a lower rotatable plate 27 resting on the table plate 18 and held thereon for rotative adjustment about the vertical axis of the machine by a swival stud 28, swivel pin or block 29, and retainer plate 30, the swivel pin 29 being countersunk in the table plate 18 (Figs. 3 and 4). Rotation of the plate 27 in one direction about the swivel pin 29 is effected by a hand screw 32 that is held, for rotation only, in a bracket 33 mounted on the table plate 18, the end of the screw 32 bearing against an edge of the plate 27 (Figs. 6 and 7). This rotation is yieldingly resisted by a spring loaded button 34 mounted on the table plate 18. The rotation is measured by an indicator gage mechanism, generally designated 35 (Fig. 7), described below.

The test part holding mechanism also comprises an upper translatable plate 36 resting on the rotatable plate 27 and held thereon for horizontal travel by side guides 37 which are screwed to the top surface of the rotatable plate 27 as shown. Horizontal adjustment of the plate 36 relative to the rotatable plate 27 is effected by a hand screw 38 that is held, for rotation only, in a bracket 39 (Figs. 5 and 6). The bracket 39 is set into a groove 40 (Fig. 7) in an edge of the plate 27 and is held in place by screws 41 (Fig. 5). The hand screw 38 is threaded edgewise into the plate 36 for moving the same, and play in the threads is resisted by a helical spring 42 (Fig. 6) surrounding the hand screw 38 and held under compression between the bracket 39 and the edge of the plate 36. Travel of the plate 36 relative to the plate 27 is measured by another indicator gage mechanism, generally designated 43 and described below.

The test part holding mechanism also comprises an adaptor, generally designated 45 (shown in detail in Figs. 2 and 4 and in phantom outline in Fig. 6), the adaptor being mounted on the plate 36 for securely gripping a part to be tested. When used to hold a jet engine turbine blade, for example, the adaptor 45 may comprise a base plate 46 having a complementary pair of spaced blocks 47 mounted thereon. Each block 47 has a lower positioning rib 48 seated in a groove in the base plate 46 for positioning and holding the two blocks 48 securely against forces tending to separate them. The blocks are held down on the base plate by countersunk screws, as shown in Fig. 2. The enlarged root R of a turbine blade (Figs. 2 and 4) may be forced upwardly against inwardly directed locking jaws on the blocks 48 by a central screw 49 that is screwed into the base plate 46 and may be manually turned about its axis by a crank arm 50 projecting outwardly between spaced feet of the base plate 46. Turning the screw 49 in one direction by means of the crank 50 raises the screw to exert upward pressure on the turbine blade root. Turning the screw 49 in the opposite direction lowers it and leaves the turbine blade for removal. An end stop 51 (Fig. 2) serves to position the turbine blade root along the gap between the blocks 47. Countersunk cap screws 52 may be used to secure the base plate 46 to the translatable plate 36 before the blocks 48 are mounted thereon. The translatable plate 36 may be tapped in any suitable locations, as shown at 53 in Fig. 6, to receive the cap screws 52 and position the base plate 46 at any position required to orient the blade to be tested relative to the templates carried by the contour analyzer, as hereinafter described.

The above described test part adaptor 45 has become conventional for holding jet engine turbine blades in guillotine gages. However, the present invention contemplates the use of any other form of adaptor suited for holding any other kind of test part which the art may wish to check with the gage of the present invention. Therefore, more detailed explanation and illustration of the test part adaptor is believed to be unnecessary.

The indicator gage mechanism 35 for measuring rotation of the plate 27, referred to above, may comprise a rigid arm 54 cast integrally with the table plate 18 or suitably rigidly secured thereto (Fig. 7). The arm 54 carries a calibrated motion measuring indicator gage 55 actuated by a plunger pin 56 mounted for longitudinal movement and urged outwardly from the case of the indicator gage by any suitable spring (not shown) contained within the case of the gage. The outer end of the pin 56 engages a bell crank 57 pivotally mounted on the arm 54. The bell crank, in turn, engages a finger 58 secured to an edge of the rotatable plate 27. As will be apparent from Fig. 7, rotation of the plate 27 in either direction about the main vertical axis Y—Y of the machine swings the bell crank about its fulcrum and causes longitudinal movement of the pin 56, which movement is preferably shown by the indicator gage 55 in degrees of rotation of the plate 27.

The indicator gage mechanism 43 for measuring translation of the translatable plate 36 relative to the rotatable plate 27, referred to above, may be mounted on a rigid tubular arm 59 clamped by means of a screw 61 in the same bucket 39 that holds the hand screw 38. The arm 59 carries a calibrated motion measuring indicator gage 60 actuated by a plunger pin 62 mounted concentrically in the arm 59 for longitudinal movement and urged outwardly from the case of the gage 60 by any suitable spring (not shown) contained within the case of the gage. The plunger pin 62 extends in the direction of relative movement of the plate 36 relative to the plate 27, and the outer end of the pin 62 engages an edge of the plate 36. As will be apparent from Fig. 6, such movement of the plate 36 in either direction along its path of travel causes longitudinal movement of the plunger pin 62, which movement is shown by the gage 60 in any desired units of linear travel of the plate 36 relative to the plate 27.

In order to position the plate 27 in a normal orientation from which its rotation in either direction is to be measured, and also to position the plate 36 on the plate 27 in a normal centered position from which its linear travel in either direction along its path is to be measured, the locking device of Figs. 8 and 9 is provided. When both of the plates 27 and 36 are in their normal positions, an aperture 63 in the table plate 18, an aperture 64 in the plate 27, and an aperture 65 in the plate 36 are aligned. As shown, the apertures 63 and 64 are of the same diameter, and the aperture 65 is somewhat larger. A locking pin 66 having longitudinally spaced portions of suitable diameters at one end thereof is shown in Fig. 8 with this end of the pin projecting with a close sliding fit into all three of the apertures 63, 64, and 65 so as to prevent any relative movement of either of the plates 27 and 36, and to prevent them from moving relative to the table plate 18.

Optionally, if desired, the opposite end of the pin 66 may have longitudinally spaced portions of suitable diameters so that, when this end of the pin is inserted through the three apertures 63, 64, and 65, clearance is provided in the aperture 65 of the plate 36 to permit limited translation thereof relative to the plate 27, and clearance is provided in the aperture 63 to permit limited rotation of the plate 27 relative to the table plate 18. The use for this is mentioned hereinafter.

A perfect test part to be checked should be so mounted that a known longitudinal axis of the part, serving as an axis of reference, such as a longitudinal axis through the center of gravity of a jet engine turbine blade, is precisely coincident with the main vertical axis Y—Y of the machine. Depending upon the curvature of the surfaces to be checked for accuracy of contour, however, the test piece may desirably be rotated about its reference axis so that the particular contours to be checked depart no more than necessary from parallelism with a horizontal axis Z—Z of the machine (Fig. 2). This favors the greatest accuracy of the contour analyzer hereinafter described. To orient the test part in this manner, the adaptor may be rotated about the machine axis Y—Y through an approxate angle $x$ (Figs. 2 and 6) from a normal orientation, and the translatable plate 36 may be drilled and tapped as required to so orient the adaptor 45 when receiving the adaptor mounting screws 52. This orientation of the adaptor is not highly critical.

The locking pin 66 may be used in the position shown in Fig. 8 is a reference point on the machine for otherwise locating the adaptor 45 both angularly and with reference to the central X—X and Z—Z axes of the machine (Fig. 2), which axes extend horizontally and have a common intersection with the main vertical axis Y—Y of the machine. This intersection is conveniently considered to be at some clearly marked reference elevation on the adaptor 45. Elevations on the test piece at which horizontal contours are to be checked may then be referred to the horizontal plane of the axes X—X and Z—Z and measured by means of the scales 22 and 23.

The locking pin 66 is also used in the position shown in Fig. 8 to lock the rotatable plate 27 and translatable plate 36 in their normal positions for supporting a perfect test part. The indicator gages 55 and 60 are set at zero when the locking pin 66 is so positioned. Then the locking pin is normally removed during subsequent use of the machine.

As shown in Figs. 1, 2, and 3, the upper portion 3 of the frame of the machine is provided with a pair of complementary columnar posts 70, preferably cast integrally therewith. The posts 70 are conveniently of generally parabolic configuration in horizontal cross section and are uniformly spaced along the axis X—X on opposite sides of the axis Y—Y of the machine. These posts constitute rigid base supports on which are mounted similar left and right gage assemblies 71 for checking opposite sides of a test part mounted on the adaptor 45. The posts 70 have oppositely and outwardly extending, horizontal tables 72 integrally formed on their upper ends to provide rigid coplanar supporting surfaces for the right and left gage assemblies mounted thereon. Since these gage assemblies are identical right and left counterparts of each other, only one of them need be described, the right-hand assembly being selected for this purpose.

Figure 11:
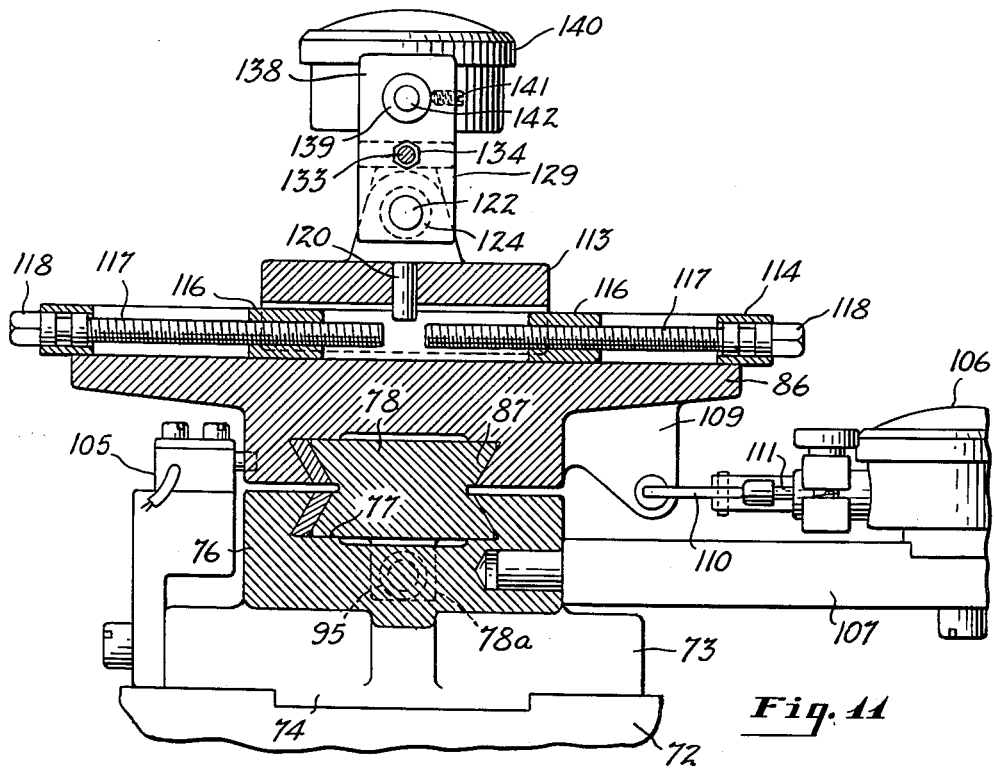
Fig. 11 is a vertical sectional view of the structure of Fig. 10, but with the contour analyzer in place, the view being taken as indicated by the line 11—11 of Fig. 3.

The right-hand gage assembly 71 may be assembled on a base plate 73 positioned on its table 72 by a bottom rib 74 set in a complementary channel in the table (Fig. 11) and secured in place by four countersunk cap screws 75 (Fig. 10). An inwardly offset carriage supporting table 76 (Fig. 3) may be cast integrally with the base plate 73. This table is provided in its upper surface with a carriage guide groove 77 having undercut side walls, at least one of which may be shimmed as shown (Figs. 11–13). A carriage block 78 is shaped to slide snugly in the guide groove 77 toward and away from the main vertical axis Y—Y of the machine. This travel of the carriage block 78 is effected (Figs. 2, 3, and 10) by a pin and slot connection of the block with a rotatable cam plate 79 having a manually operable actuating arm 80, as best shown in Figs. 3 and 10. As shown, a bracket 81 carrying a pin 82 is screwed to the outer end of the carriage block 78. The pin 82 projects downwardly into a curved slot 83 in the cam plate 79, which is rotatable about a pivot pin 84 threaded into an outwardly projecting arm 85 of the base plate 73. As shown in Figs. 2 and 10 by the solid outline and phantom outline of the arm 80, cam plate 79, pin 82, and bracket 81, swinging of the arm 80 inwardly moves the carriage block 78 inwardly, and vice versa.

A carriage 86 for mounting both a guillotine gage template and a contour analyzer is provided with a guide groove 87 in its lower surface, the groove having undercut side walls, at least one of which may be shimmed as shown (Figs. 11–13). The upper portion of the carriage block 78 is shaped to slide snugly in the groove 87 of the carriage 86, whereby the carriage 86 may slide for a limited distance on the carriage block toward and away from the main vertical axis Y—Y of the machine independently of travel of the carriage block 78. Such limited relative sliding movement of the carriage 86 and carriage block 78 may be prevented by a manually slidable locking key 88, as indicated in Figs. 3 and 12.

Referring to Figs. 3, 12, and 13, the locking key 88 is slidably mounted in a transverse key-way cut in the upper surface of the carriage block 78. It is held down in its key-way by a plate 89 that is set into the lower surface of the carriage 86 and held in place by countersunk cap screws. The plate 89 has relatively narrow inner and outer lips 91 and 92 that normally straddle the key 88 and prevent relative movement of the carriage 86 on the carriage block 78 (Figs. 3 and 12). When the key 88 is pulled outwardly to the position shown in Fig. 13, a groove 93 in the upper surface of the key permits the lips 91 and 92 to pass freely therethrough, thus freeing the carriage 86 for limited travel along the carriage block 78. A set screw 90 may be provided in the inner end of the carriage block 78 for engaging a notch 90a (Fig. 10) in the key 88 to hold it accurately in its unlocked position. Holding it in its locked position is unnecessary.

When the key 88 is in the locked position shown in Fig. 12, swinging of the arm 80 positively moves both the carriage block 78 and the carriage 86 as a unit. When the key 88 is in its unlocked position, swinging of the arm 80 positively moves the carriage block 78 in both directions, but the carriage 86 may not move precisely therewith. In this case, inward movement of the carriage 86 is yieldingly caused by a pair of helical springs 108 (Fig. 10) that have their outer ends set into the bracket 81 for the pin 82 and that have their inner ends set into the adjacent end of the carriage 86. Thus, the springs 108 cushion the inward force on the carriage 86 applied by swinging the arm 80 inwardly. When the arm 80 is swung outwardly to effect outward movement of the carriage block 78 and carriage 86 with the key 88 in its unlocked position, the carriage block 78 is moved first, carrying a pin 94 in the carriage block 78 into engagement with the lower inner end portion of the carriage 86. Thereupon, the carriage 86 is positively moved with the carriage block 78 over the balance of its outward travel.

Inward movement of the carriage block 78 may be limited by a stud 95 threaded into the outer end of the table 76 for engagement by a depending flange 78a on the carriage block, as shown in Fig. 3. The length of the head of the stud 95 is selected to stop the travel of the carriage block 78 at a predetermined zero position for a particular part to be checked with the contour analyzer. Outward movement of the carriage block 78 and carriage 86 is limited by the driving pin 82 reaching one end of its cam slot 83. A micro-switch 105 may be provided for engagement by the carriage 86 at the end of its outward travel to activate a motor circuit for driving the input shaft 5. Thus, the test part holder can be raised or lowered only when the carriage 78 and 86 are backed away from it.

The carriage 86 is provided with an upwardly and inwardly directed arm 96, preferably formed integrally with the carriage, for mounting a guillotine gage template 97a, as best shown in Figs. 17 and 18. The template 97a has a thickened outer end portion for mounting on the arm 96 with an undercut lip 98 engaged and held down by complementary undercut lips 99 on the arm 96. The undercut surface of the lip 98 of the template is held tightly against the undercut surfaces of the lips 99 of the arm 96, and the template is centered laterally thereon by means of a manually rotatable, circular disk cam 100 carried by the arm for eccentric rotation by means of a hand spoke 101 and shaft 102. The cam 100 turns with the shaft 102 in a yoke formed in the arm 96, the spoke 101 being attached to a projecting enlarged hub on the shaft. A V-shaped notch 103 in the outer end of the template 97a receives the periphery of the cam 100 as it is rotated in the direction shown by an arrow in Fig. 19 to move into the notch and bear against the inwardly converging sides of the notch with increasing pressure as the cam is tightened. The cam 100 is restrained by spacer sleeves 104 against axial movement in the yoke formed in the arm 96. Thus, the template 97a is accurately centered laterally by pressure of the cam against the diverging faces of the notch 103. When properly positioned, the machine axis X—X passes through the center of the notch 103.

The axis through the geometrical center of the cam 100 and the points of engagement of the cam with the diverging faces of the notch 103, at the time of such engagement, are located a finite distance $d$ (Fig. 19) below the level L—L of the top of the undercut surface of the arm lip 99. The eccentric axis of rotation of the cam must be at least some distance further below the plane of the line L—L than the central axis of the cam. Thus, the force exerted by the cam 100 on the template 97a tends to force its outer end downwardly against its seat 96a on the arm 96, as well as to hold the mating lips 98 and 99 firmly in engagement. If the points of engagement of the cam 100 with the faces of the notch 103 were above the level L—L, it will be noted that a moment about the upper edge of the lip 99 would be created which would tend to lift the outer end of the template 97a off its seat 105.

As most clearly shown in Figs. 11, 17, and 18, a calibrated motion measuring indicator gage 106 is mounted on the carriage supporting table 76 by means of a rigid arm 107 suitably doweled therein with a close sliding fit (Fig. 11) for convenient removal and replacement. This indicator gage is used to measure the thickness of a test part P and for other purposes, and it is actuated by the carriage 86 as the carriage is moved inward to bring the guillotine gage template 97c (Fig. 21) carried by the carriage into engagement with one side of the test part. The guillotine template used for this purpose is preferably one making contact with spaced points on the side of the test piece. The indicator gage 106 is actuated, as the template 97c approaches the test piece, by an ear 109 cast integrally with the carriage 86. As shown, the ear 109 engages a bell crank 110 on the gage, and the bell crank in turn actuates a plunger pin 111 acting, against a spring (not shown) in the case of the gage, to actuate a motion measuring indicator mechanism of the gage.

The length of the head of the stop 95 is selected to stop the carriage block 78 when the work contacting surfaces of the guillotine template 97a make contact, at a predetermined elevation, with a perfect test part that is perfectly positioned on the machine. This condition determining the length of the head of the stop 95 and the length of the guillotine template exists when the key 88 is in its locked condition so that the carriage 86 is locked to move precisely with the carriage block 78. With these conditions existing, the indicator gage 106 is set at zero.

When using the guillotine gage template 97a to check the thickness of a test part, the key 88 is moved to its unlocked position, whereupon the helical springs 93 urge the carriage 86 inwardly relative to the carriage block 78 so that the guillotine template will engage the test part, substantially before inward movement of the carriage block 78 is stopped by the stop 95, at which point the ear 109 on the carriage 86 is in engagement with the toggle 110 by which the indicator gage 106 is actuated. Continued inward movement of the carriage block 78 until it is stopped by the stop 95 will, therefore, cause inward movement of the carriage block 78 while the carriage 86 is held stationary by the test part, thus partially compressing the helical springs 93 and actuating the indicator gage 106 to its zero setting. However, if the test part being checked is thinner than the perfect prototype, the indicator gage 106 will be actuated to a point short of its zero setting, the indicator gage being calibrated to show the amount of the thickness deficiency in terms of any desired units of lineal measurement. If the part being tested is too thick, on the other hand, the indicator gage 106 will be actuated beyond its zero setting and will indicate excess thickness and the amount thereof.

Obviously, the readings of the indicator gage 106 on only one side of the machine indicate a deficiency or excess thickness on one side only of the vertical reference axis of the test part. The gage 106 on the opposite side of the machine will produce corresponding readings. If both of these gages have the same positive reading or the same negative reading, a total excess thickness or deficient thickness is indicated by the sum of the two readings, and the part is shown to be accurately positioned on the machine. If the indicator gage readings are different, however, this difference indicates that the test part is displaced in one direction or the other along the X—X axis of the machine at the elevation at which the template engages the test piece. This displacement may be due to a bow, tilt, or displacement of the test piece along the X—X axis of the machine, and the amount of the error is indicated by the magnitude of the difference in readings of the two indicator gages 106. Which of the above mentioned causes of the difference in readings is responsible for the condition may be determined by making similar measurements at different elevations on the test piece, using appropriate guillotine templates for each elevation in accordance with prior practice in the use of conventional guillotine gages. Such information may be used to make adjustments in the mounted position of the test piece in some instances, before using the contour analyzer for completing the analysis of the test part being checked. Alternatively, the guillotine gage readings may be used as a basis for preliminary corrections of the test part design before using the contour analyzer for making a final and more complete and precise analysis.

Now, considering the contour analyzer mounted on the carriage 86, it comprises a transversely slidable carriage 113 having a guide groove with undercut side walls (Figs. 3, 15, and 18) in its bottom surface, at least one being shimmed as shown. This groove snugly receives a guide block 114 that may be secured to the lower carriage 86 by countersunk screws 115 (Fig. 10). Movement of the carriage 113 transversely along the guide block 114 is limited in both directions by independently adjustable stops 116 mounted to slide in a central slot in the guide block and threaded on adjusting screws 117. The adjusting screws 117 have heads 118 on their outer ends that serve as bearings and are journaled in opposite ends of the guide block. The heads 118 have peripheral grooves into which the inner ends of set screws 119 project to hold the adjusting screws 117 against longitudinal movement in the guide block. A centrally disposed pin 120 in the bottom of the guide groove of the carriage 113 projects downwardly between the stops 116. As will be apparent, movement of the carriage back and forth is limited by engagement of the pin 120 with the stops 116 at opposite ends of its path of travel. The positions of the stops may be independently adjusted by any suitable key or wrench for gripping and turning projecting ends on the heads 118 of the adjusting screws 117.

The main contour analyzer elements comprise a pair of coaxial rods 122 and 123 that are slidably mounted in suitable guide plugs 124 set into the upper carriage 113 at the inner and outer ends thereof. The inner rod 122 has a beveled follower wheel 125 rotatably mounted on its inner end to provide a peripheral knife edge for rolling along the surface of a test part P as the upper carriage 113 and its coaxial rods 122 and 123 are moved back and forth along the path defined by the guide block 114 and its stops 116. The outer rod 123 has a similar beveled follower wheel 126 rotatably mounted on its outer end for rolling along the edge of a master template with which the contour of the test part engaged by the inner follower wheel 125 is to be compared.

As best shown in Figs. 14 and 15, the master template, generally designated T, may comprise any number of template sections, such as $T_1$, $T_2$, and $T_3$, assembled as a cartridge and selectively movable into position for engagement by the outer follower 126 for comparison with the contour of the test part P at various predetermined elevations along its length.

The pair of coaxial rods 122 and 123 are spaced axially apart at their adjacent ends to provide a substantial gap therebetween (Fig. 15); and the rods are mounted and spring biased, as hereinafter described, to hold their followers 125 and 126 in engagement with the test part and the follower, respectively, as the carriage 113 is translated to move the followers along the test part and the template. Thus, any deviation between the contours of the test part and the follower will be reflected in a change in length of the gap between the adjacent ends of the coaxial rods 122 and 123 from the length $g_1$ (Fig. 15) to, for example, the smaller gap length $g_2$ (Fig. 16). As also described in more detail hereinafter, a calibrated motion measuring indicator gage 140 is mounted on the upper carriage 113.

As best shown in Fig. 15, the adjacent end portions of the coaxial rods 122 and 123 are respectively held tightly in apertures through the lower ends of upstanding rigid fingers 128 and 129 by set screws 130. The finger 128 is guided for travel in an upright position with its rod 122 by a guide rod 131 that is slidable in an aperture through a boss 132 formed integrally with the upper carriage 113. Inward movement of the rod 122 and its finger 128 is limited by a bolt 133 which is adjustably threaded into the finger 129 and projects through a hole in the finger 128 and therebeyond to a head suitably shaped for engagement by a key or wrench for turning the bolt 133 to adjust its projecting length. A lock nut 134 is provided on the bolt 133 to lock it in its adjusted position. A helical spring 135, under compression, surrounds the adjacent ends of the rods 122 and 123 and bridges the gap therebetween for maintaining the gap and holding the follower 125 against the test piece P. Alternatively, the spring 135 may be threaded on the bolt 133, for example. Another helical spring 136 is threaded on the rod 123 and held under compression between the finger 129 and one of the guide plugs 124 for holding the follower 126 against the template T. For this purpose, the spring 136 should be selected to exert a greater force on the finger 129 than does the opposing spring 135.

The central portion of the finger 129 connected to the rod 123 is provided with an outwardly projecting horizontal branch 137 slidably resting on the top of the upper carriage 113 and serving as a guide that holds the finger 129 in its upright position. The upper end of the finger 129 is enlarged to provide a boss 138 that is apertured to receive and support a mounting tube 139 for the indicator gage 140. The case of the indicator gage 140 is mounted on the tube 139, and a set screw 141 in the boss 138 holds the indicator gage mechanism against displacement in a direction axially of the tube. An actuating plunger rod 142 is connected to the indicator gage 140 through the tube 139 and projects into endwise contact with the finger 128, being biased in that direction by a spring (not shown) within the case of the gage indicator. As will be apparent from the drawings, any change in the dimensions of the gap between the adjacent ends of the rods 122 and 123 effects a corresponding change in the spacing of the fingers 128 and 129. This causes a corresponding axial movement of the plunger rod 142 for actuating the gage 140 so as to show the magnitude and sign (positive or negative) of any deviation between the contours of the test part P and of the appropriate section of the master template T as the carriage 113 is moved back and forth to run the rod followers 125 and 126 across the test piece and template section, respectively. Extreme positions of transverse movement of the rods 122 and 123 and their followers 125 and 126, respectively, are shown in phantom outline in Fig. 14. The stops 116 on the guide block 114 are adjusted, as described above, to limit such travel of the followers as required to traverse only the surfaces of the test part and template to be compared in this manner and to prevent the followers from overrunning and giving false readings on the indicator gage 140.

As shown in Figs. 14 and 15, the master template T may comprise three template sections $T_1$, $T_2$, and $T_3$, all rigidly secured in any suitable manner to a base plate 144 of corresponding total length so as to form a unitary cartridge. The edges of the successive template sections to be compared with the test part correspond to the desired contours of successive spaced portions of the test part. By means of the motor drive and hand operated fine adjustment drive described above, the height of the test piece is adjusted to position the inner follower 125 at the level of the portion of the test piece to be compared with the section of the template engaged by the outer follower 126. Thus, the first template section $T_1$, would be positioned for use, the height of the test part would be adjusted accordingly, and the contour analyzer would be actuated transversely to cause the indicator gage 140 to indicate, by any suitable dial mechanism, where and by what amount the contour of the test part traversed by the inner follower 125 deviates from the contour of the template section traversed by the outer follower 126.

By way of illustration, the gap $g_1$ of the contour analyzer may be set to a length of, say, 0.100 inch when the inner follower 125 is in engagement with a perfect test part that is perfectly positioned on the machine. Under these conditions, the dial of the indicator gage 140 is set at zero. Thus, as the followers traverse the test part P and a section of the master template T, the deviations at all points along the path of the follower 125 may be read directly in terms of magnitude and sign. Merely by moving the next template section into position and readjusting the height of the test part accordingly, successive spaced portions of the test piece may be quickly and accurately checked in like manner.

The same operations are performed, preferably simultaneously, with the right-hand and left-hand contour analyzers so as to check both sides of the test part P as to contour and to provide data for detecting the presence and calculating the magnitude of any errors in thickness at each test elevation, and for detecting and calculating the magnitude of any bow, tangential tilt, or tangential displacement. Generally, only the maximum and minimum readings of both indicator gages 140 are taken for each elevation checked. The position of the test part P may be adjusted, if necessary, to correct for axial displacement and twist relative to the blade root by adjusting the hand screws 32 and 38 until the readings of the contour analyzer indicator gages 140 are as favorable as possible at all elevations. Thereupon the contour analyzer operations are repeated. As will be apparent from simple geometrical principles, the following determinations may be made from the final readings of the indicator gages 140:

(1) The presence and amount of deviations in contour at each elevation tested, as indicated by the difference in maximum and minimum readings of each indicator gage at a given elevation.

(2) The presence and amount of any excess or deficiency in thickness at each elevation tested, as indicated by the sum of the readings of both indicator gages at each elevation.

(3) The presence and amount of any lean, as indicated by a progressive increase in the readings of one indicator gage from one elevation tested to another, accompanied by a corresponding progressive decrease in the readings of the other indicator gage from one elevation tested to another.

(4) The presence and amount of any bow, as indicated by a progressive increase followed by a progressive decrease in the readings of one indicator gage from one elevation to another, accompanied by a reverse change in the readings of the other indicator gage.

(5) The presence and amount of any tangential displacement, as indicated by consistent positive readings on one indicator gage from one elevation to another, accompanied by consistent corresponding negative readings on the other indicator gage.

Axial displacement of the test part and the amount thereof are indicated by the reading of the indicator gage 60 after the axial position of the test part has been adjusted by means of the hand screw 38 so as to give the most favorable readings possible on the contour analyzer indicator gages 140. Twist of the airfoil portion of the test part relative to its root and the amount thereof are indicated by the reading of the indicator gage 55 after the orientation of the test part about the axis Y—Y has been adjusted by means of the hand screw 32.

In addition to the above, twist of the airfoil portion of the test part at one elevation relative to another and axial lean (in the plane of the machine axes Y—Y and Z—Z), when their presence is indicated by the other readings, may be measured quantitatively with a comparable degree of accuracy by readjusting the hand screws 32 and 38 and taking separate readings on the indicator gages 55 and 60 at each elevation tested.

Instead of making adjustments of the rotatable plate 27 and the translatable plate 36 with the locking pin removed, and reading the magnitude of these adjustments on the gages 55 and 60, these adjustments may be made with the locking pin inverted and positioned as shown in Fig. 9. The clearance shown in Fig. 9 between the pin 66 and the table plate 18 permits limited rotation of the plate 27. The clearance shown between the pin 66 and the translatable plate 36 permits limited translation of the latter. These clearances may be selected to provide freedom for adjustment of the position of a test part mounted in the adaptor 45 within tolerances permissible in the test part specifications for positioning the test part to obtain the most favorable readings on the indicator gages 140 of the contour analyzer. Then, if the contours of the test part do not deviate beyond specification tolerances, the part may be considered acceptable. If the contour deviations exceed specification tolerances, but are not too great, the part may be reworked in many instances to change only the contour so as to meet the specifications, and no readings of the indicator gages 55 and 60 are taken. This alternative procedure may be desirable when using the machine to check manufactured parts as part of a routine production inspection procedure, as distinguished from analyzing a part to determine tooling changes required before commencing regular production.

As will be apparent, the scale 22 may be used as a reference so that the height of the section of a selected test level on the test part above any desired reference level on the machine or on the work holder may be ascertained and the same levels may be checked on a series of similar test parts. For this purpose, the elevations of the scales 22 and 23 are selected to read zero height when the selected horizontal reference plane defined by the machine axes X—X and Z—Z is raised to the level of the inner followers 125 of the contour analyzer. The difference in elevation of the inner followers 125 and guillotine templates 97a and 97b must be taken into account and subtracted from the scale reading in reading the elevation at which the test part is engaged by these templates.

To facilitate accurate positioning of each template section of the template cartridge T, a notch 145 may be provided at the center of the inner edge of each template section. The template assembly may be quickly positioned on a supporting surface on the lower carriage 86, as shown, and be quickly and securely locked firmly in place by means of an eccentrically mounted circular cam 146 engaging the notch 145, the cam being designed, mounted, and actuated (in the same manner as the cam 100 for the guillotine gage template 97a) to hold the template T down on its seat and against a pair of undercut positioning lips 147 on the outer end of the carriage 86.

As stated above, all of the parts and subassemblies mounted on the right-hand post 70 of the machine frame 1 have left-hand counterparts mounted on the left-hand post 70. Corresponding reference characters have been applied in the drawings to the principal corresponding parts and subassemblies on the right and left sides of the machine. Obviously, however, the contours of the template sections used on the left-hand side of the machine may differ, as shown, from the contours of the template sections on the right-hand side of the machine and, therefore, have been designated $T_4$, $T_5$, and $T_6$.

Before the machine is used, alignment of the right and left-hand contour analyzer assemblies 71 and the parts thereof must be adjusted so that the coaxial analyzer rods 122 and 123 are horizontal and are axially aligned with each other and with the axes X—X and Y—Y of the machine, and also so that the template locking cams 100 and 146 are aligned with the axes X—X and Y—Y of the machine. As will be recognized by those skilled in the art, adjustments for these purposes may be made by shimming between various movable parts, or by replacing shims built into the machine with larger or smaller shims and adding other compensating shims as needed.

In the light of the foregoing description of an illustrative embodiment of the invention, of the principles on which it is based, and of the manner in which the various components of the illustrative machine may be manipulated in cooperative relationship with each other for various purposes, the utility and versatility of the invention should be apparent. It should also be apparent that numerous modifications of, additions to, and deletions from the illustrative machine may be made while still utilizing one or more of the features of the invention and the principles on which they are based. Accordingly, the invention is not intended to be limited to the details shown and described or to the combination of all features of the machine. Rather, the invention is intended to be limited only by the reasonable scope of the appended claims.

Having described my invention, I claim:

1. A gage for checking the contour of a test piece against a master template, comprising a base, a holder mounted on the base for holding a test piece in a selected position thereon, a first carriage mounted on said base for movement along a predetermined path toward and away from said test piece, means for mounting a master template on said first carriage, and a contour analyzer including a second carriage mounted on said first carriage for travel relative thereto along a predetermined path transverse to the path of said first carriage, first and second surface followers mounted on said second carriage for independent travel relative thereto for engagement respectively with a test piece on said holder and with a master template on said first carriage, yieldable means for biasing said first and second followers respectively toward the test piece position and the master template position, and means indicating relative travel of the followers on said second carriage as it is moved to cause the first and second followers to respectively traverse the contours of the test piece and the master template, and means for reciprocating said first carriage for engagement and disengagement of the first follower and the test piece.

2. A gage for checking the contour of a test piece against a master template, comprising a base, a holder mounted on the base for holding a test piece in a selected position thereon, a first carriage mounted on said base for movement along a predetermined rectilinear path toward and away from said test piece, means for mounting a master template on said first carriage, and a contour analyzer including a second carriage mounted on said first carriage for rectilinear travel relative thereto along a predetermined path transverse to the path of said first carriage, first and second surface followers mounted on said second carriage for independent rectilinear travel relative thereto for movement in the same direction toward and into engagement respectively with a test piece on said holder and a master template on said first carriage, yieldable means for biasing said first and second followers respectively in said same direction toward the test piece position and the master template position, and means indicating relative travel of the followers on said second carriage as it is moved to cause the first and second followers to respectively traverse the contours of the test piece and the master template, and means for reciprocating said first carriage along its path for engagement and disengagement of the first follower and the test piece.

3. A gage for checking the contour of a test piece against a master template, comprising a base, a holder mounted on the base for holding a test piece in a selected position thereon, a first carriage mounted on said base for movement along a predetermined rectilinear path toward and away from said test piece, means for mounting a master template on said first carriage, and a contour analyzer including a second carriage mounted on said first carriage for rectilinear travel relative thereto along a predetermined path normal to said path of the first carriage, first and second surface followers mounted on said second carriage for independent rectilinear travel relative thereto for movement in the same direction toward and into engagement respectively with a test piece on said holder and a master template on said first carriage, yieldable means for biasing said first and second followers respectively in said same direction toward the test piece position and the master template position, and means indicating relative travel of the followers on said second carriage as it is moved to cause the first and second followers to respectively traverse the contours of the test piece and the master template, and means for reciprocating said first carriage along its path for engagement and disengagement of the first follower and the test piece.

4. A gage for checking the contour of a test piece against a master template, comprising a base, a holder mounted on the base for holding a test piece in a selected position thereon, a first carriage mounted on said base for movement along a predetermined rectilinear path toward and away from said test piece, means for mounting a master template on said first carriage, and a contour analyzer including a second carriage mounted on said first carriage for rectilinear travel relative thereto along a predetermined path normal to said path of the first carriage, first and second surface followers mounted on said second carriage for independent travel relative thereto in spaced apart relationship along aligned rectilinear paths and in the same direction toward and into engagement respectively with a test piece on said holder and a master template on said first carriage, yieldable means for biasing said first and second followers respectively in said same direction toward the test piece position and the master template position, and means indicating relative travel of the followers on said second carriage as it is moved to cause the first and second followers to respectively traverse the contours of the test piece and the master template, and means for reciprocating said first carriage along its path for engagement and disengagement of the first follower and the test piece.

5. A gage for checking the contour of a test piece against a master template having a similar contour, comprising a base, means for holding a master template in a predetermined position on a first carriage supported by the base, a holder mounted on the base for holding a test piece in a position thereon spaced from said first carriage, and a contour analyzer mounted on the first carriage; said contour analyzer comprising a second carriage mounted between the master template position on said first carriage and the test piece position on said holder for rectilinear travel relative to the first carriage along a predetermined path, a pair of surface followers movably mounted on the second carriage in spaced relationship for engagement, respectively, with the side of the master template facing away from the test piece and the side of the test piece facing toward the master template, means constraining movement of said followers along aligned rectilinear paths relative to said second carriage, said aligned rectilinear paths being normal to the path of travel of the second carriage, means for moving said first carriage toward the test piece to engage one of said followers therewith, yieldable means for biasing the followers in the same direction against said sides of the master template and of the test piece, respectively, and means indicating change in the space between the followers as they move in engagement with the master template and the test piece, respectively, in response to movement of the second carriage along its path of travel.

6. A gage for checking the contour of a test piece against a master template, comprising a base, a first carriage mounted on the base for movement along a first path toward and away from a test piece position, a second carriage mounted on the first carriage for movement relative thereto along a second path transverse to said first path, means for mounting a master template on said first carriage, and a contour analyzer mounted on said second carriage, said contour analyzer comprising a pair of spaced surface followers mounted on said second carriage for movement therewith parallel to said second path and for independent movement relative to said second carriage in directions parallel to said first path, means biasing one of said followers against said master template and biasing the other of said followers toward said test piece position for yielding engagement with a test piece in response to movement of the first carriage toward the test piece, and means indicating change in the spacing of said followers as the second carriage is moved along said second path relative to said first carriage to cause said followers to traverse said master template and a test piece, respectively.

7. A gage according to claim 6 including means for mounting a test piece on said base at said test piece position and means for adjustably moving said test piece transversely to said first and second paths.

8. A gage according to claim 6 including means for mounting a test piece on said base at said test piece position, means for adjustably rotating said test piece relative to said base about an axis transverse to said first and second paths, and means indicating the amount of rotation of said test piece about said axis from a predetermined reference position.

9. A gage according to claim 6 including means for mounting a test piece on said base at said test piece position, means for adjustably moving said test piece relative to said base in a direction parallel to said second path, and means indicating the amount of such adjusting movement from a predetermined reference position.

10. A gage according to claim 6 including means for mounting a test piece on said base at said test piece position, means for adjustably rotating said test piece relative to said base about an axis transverse to said first and second paths, means indicating the amount of rotation of said test piece from a predetermined reference position, means for adjustably moving said test piece transversely to said first and second paths, and means indicating movement of said test piece transversely to said first and second paths from a predetermined reference position.

11. A gage according to claim 6 including means for mounting a test piece on said base at said test piece position, means for adjustably moving said test piece relative to said base in a direction parallel to said second path, means for adjustably moving said test piece transversely to said first and second paths, and separate means indicating the amount of movement of said test piece parallel to said second path and the amount of movement thereof transversely to said first and second paths from a predetermined reference position.

12. A gage according to claim 6 including means for mounting a test piece on said base at said test piece position, means for adjustably rotating said test piece relative to said base about an axis transverse to said first and second paths, means for adjustably moving said test piece parallel to said second path, and separate means indicating the amount of rotation of said test piece and the amount of movement thereof parallel to said second path from a predetermined reference position.

13. A gage according to claim 6 including means for mounting a test piece on said base at said test piece position, means for adjustably rotating said test piece relative to said base about an axis transverse to said first and second paths, means for adjustably moving said test piece relative to said base in a direction parallel to said second path, means for adjustably moving said test piece in a direction transversely to said first and second paths, and separate means indicating the amount of rotation of said test piece, the amount of movement thereof parallel to said second path, and the amount of movement thereof transversely to said first and second paths from a predetermined reference position.

14. A gage comprising a base and a gage element mounted thereon for facile removal and replacement, said base including a flat supporting surface and a lip at one edge thereof providing a transverse surface forming an acute interior angle with said supporting surface, said transverse surface terminating a predetermined distance outwardly from said supporting surface, a gage element having a flat supporting surface and an edge surface inclined thereto for engagement with said transverse surface of the base when said flat surfaces of the gage element and base are also engaged, the gage element having an opposite edge surface having a notch therein defined by inwardly converging side walls that are substantially normal to said flat surface of the gage element and a circular disk cam having a periphery thinner than the maximum width of said notch, said disk cam being mounted on said base for rotation about an eccentric axis parallel to the center axis of the cam and parallel to said surfaces of the base, said eccentric axis being disposed between the plane of said flat surface of the base and a second parallel plane through the outer limit of said transverse surface of the base, said cam, when rotated to an unlocked condition, being disposed with its periphery aligned with the notch and spaced outwardly from the walls thereof and the periphery of the cam when rotated to a locked condition being in forceable engagement with both converging walls of the notch with the center axis of the cam disposed between said second plane and a parallel plane containing said eccentric axis.

References Cited in the file of this patent
UNITED STATES PATENTS

| | | |
|---|---|---|
| Re. 22,953 | Praeg | Dec. 23, 1947 |
| 2,433,421 | Bowness | Dec. 30, 1947 |
| 2,495,891 | Davis | Jan. 31, 1950 |
| 2,633,020 | Abbott | Mar. 31, 1953 |
| 2,640,272 | Bean | June 2, 1953 |
| 2,707,321 | Breisch | May 3, 1955 |
| 2,855,689 | Campbell | Oct. 14, 1958 |
| 2,858,615 | Aller | Nov. 4, 1958 |